NOISE SUPPRESSION TECHNIQUE FOR RADIO CIRCUITS

Filed Aug. 6, 1959

INVENTOR
RICHARD CLAY

BY Charles J. Elderkin

ATTORNEY

United States Patent Office 3,084,329
Patented Apr. 2, 1963

3,084,329

NOISE SUPPRESSION TECHNIQUE FOR RADIO CIRCUITS

Richard Clay, Indian Rocks Beach, Fla., assignor to Electronic Communications, Inc., St. Petersburg, Fla.
Filed Aug. 6, 1959, Ser. No. 832,081
2 Claims. (Cl. 325—65)

This invention relates to methods of communication and communication systems and more particularly to a novel method and system for communicating intelligence in such a manner that certain types of noise are cancelled.

Since the early days of radio, many attempts have been made to reduce the inherent noise occurring in radio communication systems. For example, one prior scheme attempts to detect the noise on a frequency different from the desired frequency and to place the detected noise in opposition to the noise on the desired frequency. More recently, other systems of noise suppression have employed auto-correlation techniques. In general, however, the noise suppression techniques proposed heretofore have been either unduly complex or relatively ineffective to accomplish the desired extent of noise suppression.

It is accordingly a principal object of the present invention to provide an improved noise suppression method and system capable of overcoming the disadvantages of such prior-art proposals.

Another object is to devise a noise suppression technique which is both simpler and more effective than comparable techniques employed heretofore.

A further object is to provide an improved system and method for communicating intelligence.

An additional object is to provide a noise suppression system and method which does not require an increased band-width.

In order that the manner in which these and other objects are attained in accordance with the invention can be understood in detail, reference is had to the accompanying drawings, which form a part of this specification, and wherein.

Figure 1:
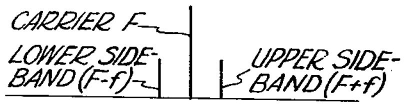
FIG. 1 is a diagram illustrating a conventional amplitude modulated signal.
Figure 2:
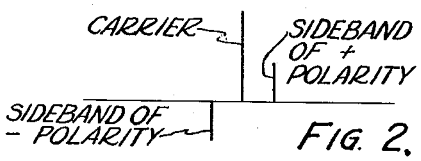
FIG. 2 is a similar diagram illustrating a signal in accordance with the invention.
Figure 4:
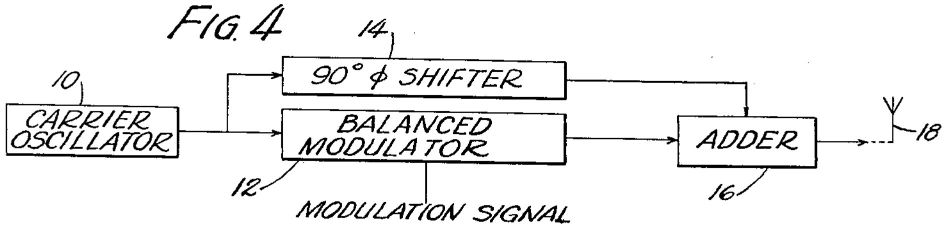
Figure 5:
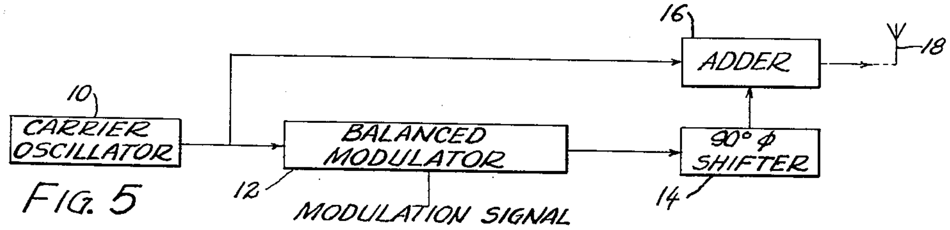
Figure 6:
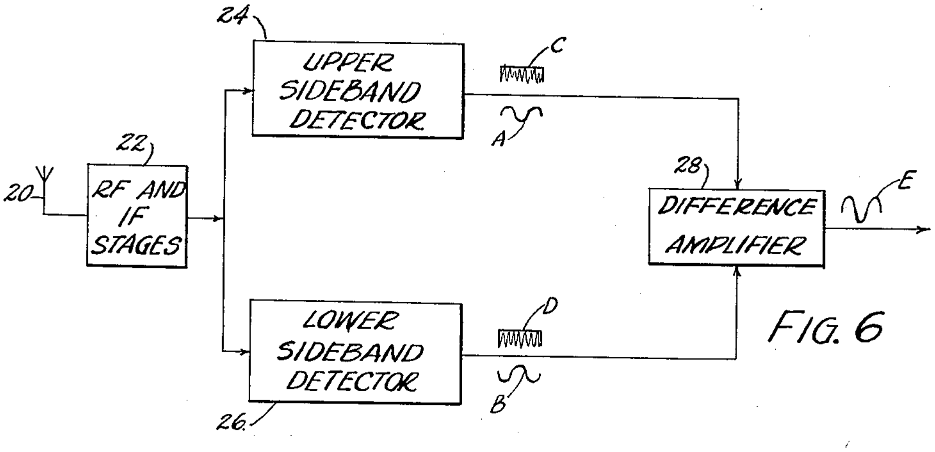
Figure 3:
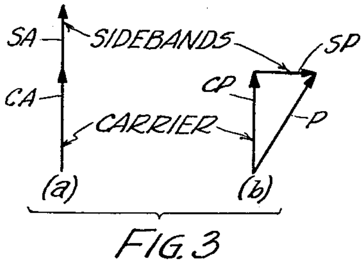

FIGS. 3*a* and 3*b* are vector diagrams relating to the signals of FIGS. 1 and 2;

FIG. 4 is a diagram illustrating one form of transmitter in accordance with the invention;

FIG. 5 is a diagram illustrating another form of transmitter in accordance with the invention, and FIG. 6 is a diagram illustrating a receiver constructed in accordance with the invention.

Stated generally, the objects of the invention are accomplished by transmitting intelligence as oppositely poled modulation on respective distinguishable signals, receiving the signals, detecting the respective modulations separately, and subtracting the respective modulations whereby, as the original intelligence is reproduced, the noise is cancelled.

Referring to the drawings, FIG. 1 illustrates the amplitude, frequency, and polarity relationship of the sidebands and carrier in a conventional amplitude modulated signal. The signal has upper and lower sidebands of equal amplitude, one of which is located at a frequency equal to the sum of the carrier frequency F and the modulation frequency *f* and the other of which is located at a frequency equal to the difference between the carrier frequency F and the modulation frequency *f*. Both of the sidebands have the same polarity and contain the same information. Detectors for these sidebands are substantially equally affected by the noise, and the conventional AM receiver has no means for separating the signal from the noise which rides through with it.

The present invention makes use of the redundancy of information conveyed by the two sidebands. The basic technique of the invention involves the inversion of one of the sidebands so that sidebands of opposite polarity are obtained, as shown in FIG. 2. Detectors for these sidebands are also affected substantially equally by noise, but, while the noise detected with each sideband signal is substantially of the same polarity, the modulation is oppositely poled. Hence, noise cancellation can be obtained by detecting the respective sideband modulations and obtaining the algebraic difference of the same.

The conventional AM signal of FIG. 1 has a corresponding vector diagram as shown in FIG. 3*a*, the sideband vector SA being shown added to the carrier vector CA in phase. The amplitude of the resultant vector varies as a function of time. The signal shown in FIG. 2 can be produced by placing the sideband vector in quadrature with the carrier vector. Thus, as shown in FIG. 3*b*, vector SP is in quadrature with vector CP. The resultant vector P varies in phase about the carrier vector CP as a function of time and also varies in amplitude. The signal of FIG. 2 thus represents a phase modulated signal with some amplitude modulation superimposed. The sidebands shown represent the first upper and lower sidebands of the phase modulation spectrum and the signal is somewhat similar to that obtained with narrow band phase modulation wherein the maximum phase deviation is kept small.

One manner in which the signal of FIG. 2 can be obtained is illustrated in FIG. 4. The system here shown employs what is essentially an Armstrong FM technique (Armstrong, E. H., "A Method of Reducing Disturbances in Radio Signalling by a System of Frequency Modulation," Proceedings of IRE, May 1936, p. 689) without pre-emphasis, limiting, or frequency multiplication. A carrier oscillator 10 produces a suitable radio frequency signal which is applied to a balanced modulator 12 to which is also applied a suitable modulation signal. The output of the balanced modulator is a carrier suppressed double sideband signal. The output of the oscillator 10 is also applied to a 90° phase shifter 14, and the outputs of the phase shifter and the balanced modulator are combined in an adder 16. The output of the adder is a signal in which the carrier and sideband components are in quadrature. This signal can be amplified and is then applied to a transmitting antenna 18. Any amplifier subsequent to the adder must be linear. The relative amplitudes of carrier and sidebands can be controlled by adjusting the inputs to the adder 16 in any suitable fashion.

Rather than shifting the output of the carrier oscillator, the output of the modulator can be shifted. This alternative is illustrated in FIG. 5, where 90° phase shifter 14 is connected to the output of modulator 12, the outputs of phase shifter 14 and carrier oscillator 10 being combined in adder 16.

The transmitted signal is received by an antenna 20 and applied to the conventional RF and IF stages 22 of a superheterodyne receiver. The output from these stages is applied to conventional upper and lower sideband detectors 24 and 26. The sidebands may be separated by filters forming a part of these detector circuits or by phasing methods known in the art. The detected modulation is indicated at A and B and the superimposed noise is indicated at C and D. It will be noted that the modulations are of opposite polarity, while the noise has the same polarity.

The outputs of the detectors 24 and 26 are applied to a difference amplifier 28 operative to obtain the algebraic difference of the inputs applied thereto. The performance of this function may also be accomplished simply by arranging the detectors in series with the proper polarity. In the subtraction process the noise components C and D are in opposition and hence are cancelled, while the modulation components A and B combine to produce an output E from the difference amplifier. It is important that the parallel channel portions of the receiver (i.e., the portions which convey the separate sideband signals) have identical characteristics so that the transient response for noise in the channels will be the same and the effects of the noise will be cancelled in the difference amplifier.

It is apparent from the foregoing description that the invention provides a unique noise suppression technique and that noise suppression is obtained by a system that is simple and effective, and which requires no increase in bandwidth. While a preferred embodiment of the invention has been shown and described, it will be apparent to those skilled in the art that changes can be made in this embodiment without departing from the principles and spirit of the invention as defined in the appended claims. Accordingly, the foregoing embodiment is to be considered illustrative, rather than restrictive of the invention, and those modifications which come within the meaning and range of equivalency of the claims are to be included therein.

What is claimed is:

1. In a communication system, the combination of a source of carrier oscillations, a source of modulating signals, means for modulating said carrier oscillations with said modulating signals to produce sidebands having a resultant in quadrature with said carrier oscillations, means operative to detect the modulations on said sidebands separately, and means for obtaining the difference of the detected modulations of the respective sidebands.

2. In a communication system, the combination of a carrier frequency oscillator, a balanced modulator coupled to said carrier oscillator and to a source of modulation signals, means connected to said oscillator and modulator and operative to combine the output of said modulator in quadrature with the output of said oscillator, whereby sidebands of opposite polarity are produced, detector means for detecting said sidebands separately, and means for obtaining the algebraic difference of the detected modulation on the respective sidebands.

References Cited in the file of this patent

UNITED STATES PATENTS

| | | |
|---|---|---|
| 2,101,529 | Breedlove | Dec. 7, 1937 |
| 2,104,635 | Breedlove | Jan. 4, 1938 |
| 2,116,814 | Wilbur | May 10, 1938 |
| 2,175,270 | Koch | Oct. 10, 1939 |
| 2,248,462 | Pollack | July 8, 1941 |
| 2,957,953 | Woodward | Oct. 25, 1960 |

OTHER REFERENCES

Proceedings of the I.R.E., 1936, vol. 24, pp. 689–740, Edwin H. Armstrong, "A Method of Reducing Disturbances in Radio Signalling by a System of Frequency Modulation."